US006649734B2

(12) United States Patent
Campbell et al.

(10) Patent No.: US 6,649,734 B2
(45) Date of Patent: Nov. 18, 2003

(54) CURABLE COATING COMPOSITIONS HAVING IMPROVED COMPATIBILITY AND SCRATCH AND MAR RESISTANCE, CURED COATED SUBSTRATES MADE THEREWITH AND METHODS FOR OBTAINING THE SAME

(75) Inventors: Donald Campbell, Hartland, MI (US); Vincent Cook, Münster (DE); Bruce Oermann, Clinton Township, MI (US); William Bearyman, Southfield, MI (US)

(73) Assignee: BASF Corporation, Southfield, MI (US)

( * ) Notice: Subject to any disclaimer, the term of this patent is extended or adjusted under 35 U.S.C. 154(b) by 14 days.

(21) Appl. No.: 10/127,993

(22) Filed: Apr. 23, 2002

(65) Prior Publication Data

US 2003/0009006 A1 Jan. 9, 2003

Related U.S. Application Data

(60) Provisional application No. 60/296,851, filed on Apr. 23, 2001.

(51) Int. Cl.[7] ............................................. C08G 73/00
(52) U.S. Cl. ...................... 528/422; 528/486; 528/493; 525/278; 525/326; 525/363; 428/423.1
(58) Field of Search .................. 528/422, 486, 528/493; 525/278, 326, 326.3; 428/423.1

(56) References Cited

U.S. PATENT DOCUMENTS

| 3,317,474 A | 5/1967 | Jones ........................... 260/57 |
| 3,810,853 A | 5/1974 | James ........................... 260/21 |
| 4,812,336 A | 3/1989 | Okamoto et al. ............ 427/257 |
| 5,057,557 A | 10/1991 | Treybig et al. .............. 523/404 |
| 5,115,083 A | 5/1992 | Piedrahita et al. .......... 528/230 |
| 5,175,227 A | 12/1992 | Gardon et al. ................ 528/45 |
| 5,288,820 A | 2/1994 | Rector, Jr. et al. .......... 525/510 |
| 5,352,740 A | 10/1994 | Ishidoya et al. ............. 525/119 |
| 5,439,710 A | 8/1995 | Vogt et al. ................. 427/407.1 |
| 5,549,929 A | 8/1996 | Scheibelhoffer et al. .... 427/282 |
| 5,660,937 A | 8/1997 | Ishidoya et al. ......... 428/423.1 |
| 5,703,155 A | 12/1997 | Swarup et al. ............... 524/558 |
| 5,859,082 A | 1/1999 | Sufi ........................... 521/136 |
| 5,886,085 A | 3/1999 | Heuwinkel et al. ......... 524/507 |
| 5,965,646 A | 10/1999 | Norby ........................ 524/247 |
| 5,980,993 A | 11/1999 | Mauer et al. ................ 427/422 |
| 5,989,642 A | 11/1999 | Singer et al. ............. 427/407.1 |
| 6,013,724 A | 1/2000 | Mizutani et al. ............ 524/588 |
| 6,040,062 A | 3/2000 | McGee et al. ............... 428/500 |
| 6,040,360 A | 3/2000 | Menovcik et al. .......... 523/206 |
| 6,046,259 A | 4/2000 | Das et al. ..................... 524/40 |
| 6,107,441 A | 8/2000 | Bright et al. ................ 528/254 |

FOREIGN PATENT DOCUMENTS

| EP | 409 301 | 6/1990 | ........... C08G/18/32 |
| EP | 603 659 | 12/1993 | ............ B05D/7/00 |
| JP | 62-174276 | 7/1987 | ............ C09D/5/28 |
| JP | 2298562 | 12/1990 | ............ C09D/5/00 |
| JP | 3-95278 | 3/1991 | ............ C09D/5/28 |
| JP | 3-86771 | 4/1991 | ............ C09D/5/28 |
| JP | 7-62269 | 3/1995 | ............ C09D/5/03 |
| JP | 3006400 | 11/1999 | ......... C09D/133/14 |
| JP | 3006408 | 2/2000 | ......... C09D/167/00 |

OTHER PUBLICATIONS

BASF Coporation, et al., International Search Report PCT/US02/12845, International filing date Apr. 23, 2002.
Database WPI, Week 9518, NA 1995–137070, XP00220859 & JP 07 062269A.
Database WPI, Week 9748, NA 1996–295680, XP002208580 & JP 08 127752 [a].
Elsevier Sequoia S.A., Lausanne Progress Organic Coatings, An International Review Journal, 8/1980, pp. 161–182.
Rose A. Rynta and B.D. Abekk, Scratch Resistance Behavior of Model Coating System, Feb. 10–12, 1999, pp. 47–53.
Werner J. Blank and William L. Hensley, Use of Amino Cross–Linking Agents In Waterd–Based Coatings, 9/2172, pp. 46–50.
Dennis E. Erickson Using Melamine Crosslinkers in Developing High–performance Coatings, pp. 1–6.
Resins & Additives—Global Solutions, Product Summary Resimene® Amino Crosslinker Resins, pp. 1–5.
Resins & Additives—Global Solutions, Product Summary, Technical Bulletin Resimene® High Solids Amino Resin Recommendations with Nacure® & K–Cure® Acid Catalysts, pp. 1–5.
P.E. Ferrell et al., The Reactions of Amines with Melamine Formaldehyde Crosslinkers in Thermoset Coatings, 10/9–11/95, pp. 1–9.
Zeno W. Wicks, Jr., et al., Amine Solubilizers for Water–Soluble Acrylic coating, Oct. 27, 1977, pp.39–46.
Coating Additives, Nacure® & K–Cure® Acid and Blocked Acid Catalysts, pp. 1–5.
Loren W. Hill et al., Effect of Melalmine–formaldehyde Structure on Cure Response of Thermoset Coating, Published in the Jornal of Coatings Technology, vol. 71 No. 897 pp. 1–13.

(List continued on next page.)

Primary Examiner—Duc Truong
(74) Attorney, Agent, or Firm—Mary E. Golota

(57) ABSTRACT

The invention provides coating compositions having improved scratch and mar resistance. The curable coating compositions of the invention comprise a film-forming component (A) comprising one or more active hydrogen containing components (a), and one or more curing agents (b) comprising at least one aminoplast resin (bi) having from 0.5 to 3.5 moles of NH per mole of aminoplast resin (bi), a blocked acid catalyst (B) having a blocking agent which is not a tertiary amine, and a tertiary amine (C) present in an amount equal to 10 to 150% by weight of the blocking agent. The invention farther provides a method of making cured coated substrates having improved scratch and mar resistance as well as a method of making multilayer coating compositions.

23 Claims, No Drawings

OTHER PUBLICATIONS

George D. Vaughn, How Melamines with Butoxy or Imino Functionality Afffect Coatings Properties, Aug. 1998, pp. 58–62.

Cymel Resins for Coatings and Specialty Application, pp. 13.

English Translation, Japanese Patent Application Kokai Publicatiion No. S64–31875.

English Translation of JP 07–062269.

English Translation of JP3006408.

English Translation of JP3006400.

English Abstract JP3–86771.

English Abstract JP2298562.

English Abstract JP3–95278.

CURABLE COATING COMPOSITIONS HAVING IMPROVED COMPATIBILITY AND SCRATCH AND MAR RESISTANCE, CURED COATED SUBSTRATES MADE THEREWITH AND METHODS FOR OBTAINING THE SAME

FIELD OF THE INVENTION

The invention relates to curable coating compositions having improved scratch and mar resistance, especially to automotive clearcoat coating compositions having improved scratch and mar resistance.

BACKGROUND OF THE INVENTION

Composite color-plus-clear coatings are widely utilized in the coatings art. They are particularly desirable where exceptional gloss, depth of color, distinctness of image, and/or special metallic effects are required.

As used herein, the term "composite color-plus-clear" relates to composite coating systems requiring the application of a first coating, typically a colored basecoat coating, followed by the application of a second coating, generally a clearcoat, over the noncured or "wet" first coating. The applied first and second coatings are then cured. Thus, such systems are often described as "wet on wet" or "two-coat/one bake". Drying processes which fall short of complete cure may be used between the application of the coatings.

Color-plus-clear systems are often selected when an exterior coating must possess an optimum visual appearance as well as superior durability and weatherability. As a result, the automotive industry has made extensive use of color-plus-clear composite coatings, especially for automotive body panels.

Minimum performance requirements for coating compositions intended for use on automotive body panels include high levels of etch resistance, intercoat adhesion, repair adhesion, substrate adhesion, scratch and mar resistance, chip resistance, humidity resistance, weatherability as measured by QUV and the like. Color-plus-clear composite coatings and/or the individual components thereof must also be capable of providing a visual appearance characterized by a high degree of gloss, distinctness of image (DOI), and smoothness. The latter requirements are particularly important for clearcoat compositions.

Scratch and mar resistance has proven to be a particularly difficult performance property to achieve relative to the balance of the other required performance and appearance properties. Scratch and mar resistance typically refers to a coating's ability to resist scratching from mechanical abrasions caused by car wash brushes, tree limbs, keys, fingernails, and the like. As stated by one researcher, "[i]ncreased scratch resistance of coatings has been a long sought-after goal in the automotive industry . . . . The ability to quantify what the variances in coating attributes contribute to increased scratch resistance, however remains a subject of controversy." Ryntz, R. A., Abell, B. D., Pollano, G. M., Nguyen, L. H., and Shen., W. C., "Scratch Resistance Behavior of Model Coating Systems" JOURNAL OF COATINGS TECHNOLOGY, 72, No.904, 47(2000). As the exterior most coating in the color-plus-clear composite system, it is particularly important that clearcoat compositions possess advantageous scratch and mar resistance.

In addition to providing the foregoing performance and appearance parameters, the various coating components must be easy to apply in a manufacturing environment. All components of a composite color-plus-clear coating will preferably be resistant to application defects resulting from variations in application and/or curing environments.

Finally, any coating composition that is intended for use in a composite color-plus-clear system must be compatible with a wide variety of other coating compositions. For example, a coatings manufacturer may not formulate a basecoat composition for use solely with one particular primer or clearcoat composition. Furthermore, in many automotive paint shops, the clearcoat supplier may not supply all of the basecoats that are used in the wet on wet application process. In such cases where the clearcoat supplier has no control over the basecoat formula, it is particularly desirable to have compatibility with a wide range of basecoat types. Compatibility and ease of use with many commercially available coating compositions is thus a necessity for the individual components of a composite color-plus-clear coating system. A successful clearcoat composition will be compatible with both waterborne and solventborne basecoat compositions, as well as medium and high solids versions thereof. This compatibility must exist regardless of the differences in film-forming technology. "Compatible" as used herein refers to a combination of two or more individual coating components which provides acceptable levels of the previously discussed performance, appearance and application requirements of composite color-plus-clear systems.

However, certain basecoat formulations present particular compatibility challenges for the clearcoat coating manufacturer. For example, waterborne basecoats, particularly those containing tertiary amines, often appear to cause unacceptable wrinkling in subsequently applied and cured clearcoat formulations. Similarly, it has been found that basecoats containing high imino aminoplast resins present challenges for subsequently applied clearcoat compositions, especially with regard to intercoat adhesion.

Thus, the challenge for the coatings manufacturer is to provide coating compositions, especially clearcoat compositions, which provide all of the necessary performance, appearance and application properties discussed above but which are further compatible with a wide array of commercially available coating compositions, including but not limited to, waterborne basecoat formulations and basecoat formulations containing high imino aminoplasts. More particularly, it would be advantageous to retain or improve the performance, appearance and application parameters of prior art clearcoats but without the basecoat compatibility issues discussed above.

However, the prior art has been unable to achieve these advantages.

Japanese Patent Nos. 3006400 and 3006408 disclose water-based acrylic resin coating compositions having aminoplast resin crosslinking agents and amine-blocked acid catalysts. The compositions are used to coat polyester-coated deep drawn cans and teach that a combination of amine-blocked acid catalysts having different dissociation temperatures must be used to provide improvements and/or desirable performance in adhesion, retort resistance, scratch resistance, fabricability and glossiness. In particular, the compositions must have an amine-blocked acid catalyst (A) having a dissociation temperature of 45 to 65° C. and two or more of amine-blocked acid catalysts (B/2a), (C/2b), (D)/2c) respectively having dissociation temperatures of 100 to 120° C., 120 to 140° C., and/or 150 to 170° C.

Japanese Unexamined Patent Publication 7-62269 discloses powder paint coating compositions for use in a method for obtaining decorative honeycomb or turtle shell patterns. The compositions require the use of a toluene sulphonamide-modified melamine resin having a specific glass transition temperature and a sulphonic acid blocked with an amino compound having secondary or tertiary amino groups.

Japanese Patent Publication 2645494 discloses a paint composition having a hydroxyl containing polyester or acrylic resin, a crosslinking resin of at least one methylated melamine or butylated melamine, and a sulphonic acid blocked with a tertiary amine having a boiling point of 80–115° C.

U.S. Pat. No. 5,115,083, Piedrahita et al., discloses curable compositions having a least one aminoplast (A) and a catalyst (B) selected from the acid, anhydride, ester, ammonium salt or metal salt of three specific phosphorus and sulfur containing compound, and aminoplast coreactants (C) which may be any agent which is reactive with the aminoplast resin. Examples of suitable coreactants (C) include polyfunctional amines such as those having at least one tertiary amino group.

U.S. Pat. No. 5,175,227, Gardon et al., discloses a high solids coating composition intended to be a one package isocyanate free coating. The coating requires a particular hydroxyl functional polyurethane polyol and a hydroxyl reactive crosslinking agent. The patent further teaches that well-known acid catalysts may be used such as amine blocked PTSA such as Byk Mallinkrodt's VP-451 and amine blocked DDBSA such as Nacureg 5226 and Nacure® XP-158.

U.S. Pat. No. 5,288,820, Rector et al., discloses thermosetting coating compositions having a film-forming polymeric material with acetoacetate residues (1), an amino resin crosslinking agent (2), an organic sulfonic acid catalyst (3) such as Nacure® XP-379, an experimental amine blocked DDBSA, and a specific epoxide containing compound.

U.S. Pat. No. 5,439,710, Vogt et al., discloses a method for obtaining multilayer coatings wherein at least three directly adjacent layers containing resins having alternating polarity are applied. Example D discloses a cationic water-base lacquer using a higher-molecular melamine resin containing higher molecular methoxyimino groups and a catalyst in the form of an amine blocked sulphonic acid.

U.S. Pat. No. 5,549,929, Scheibelhoffer et al., discloses a screen printable coating composition having one or more hydroxyl functional materials (I), one or more crosslinking agents (II), one or more crystalline reactive diluents (III), and one or more catalysts (IV). Suitable crosslinking agents (II) are said to include high imino melamine resins while suitable catalysts (IV) include tertiary or quaternary amines; blocked sulfonic acids; blocked acid and other Bronsted acids; and complexed Lewis acids. Specifically identified catalysts include those available from King Industries under the designations Nacure® 155, 3525, 3300, XP49-110, 1419, 1323, 3327, 4054, and 1040.

U.S. Pat. No. 5,886,085, Heuwinkel et al., discloses an aqueous coating material. Example 17 discloses a water-thinnable clear lacquer made with a particular polyester oligomer polyacrylate, a commercial melamine with a high imino-functionality, and a hindered amine light stabilizer, the composition being neutralized with dimethylethanolamine.

U.S. Pat. No. 5,965,646, Norby, discloses a thermoset adhesive containing an acrylic latex (a), a polyurethane dispersion (b), a fugitive tertiary amine (c) selected from diethylethanol amine and dimethylethanol amine, and a methoxymethyl imino melamine (d).

U.S. Pat. No. 5,980,993, Mauer et al., discloses a method of applying a color plus clear composition requiring the heating of the clear composition prior to application. The description of the crosslinkers indicates that high imino melamines are preferred while the preferred use of strong acid catalysts is disclosed.

Finally, U.S. Pat. No. 5,989,642, Singer et al., discloses a method of producing a color plus clear composite wherein the clear coating composition requires the use of carbamate and/or urea functional materials in conjunction with aminoplast crosslinking agents. Example 1 discloses a composition containing a carbamate functional acrylic, a high imino melamine, phenyl acid phosphate, and a sterically hindered tertiary amine light stabilizer.

Notwithstanding the foregoing, the prior art has failed to provide clearcoat coating compositions which possess the necessary balance between preformance, appearance and application requirements but are compatible with a wide variety of basecoat formulations, especially the most challenging basecoat formulations.

Accordingly, it is an object of this invention to provide a coating composition which can be used as a clearcoat over a wide variety of basecoat formulations, including those containing tertiary amines or high imino aminoplast resins, to provide multilayer coated articles which are substantially free of wrinkling.

It is another object of the invention to provide a coating composition that provides cured, coated substrates having improved scratch and mar resistance.

It is a further object of the invention to provide a coating composition having improved scratch and mar resistance which can be used to provide a substantially unwrinkled appearance over a wide variety of basecoat formulations, including waterborne basecoats containing tertiary amines.

It is a further object of the invention to provide coating compositions that simultaneously provide desirable levels of durability and etch resistance.

SUMMARY OF THE INVENTION

These and other objects have unexpectedly been achieved with a particular combination of a high imino aminoplast resin, a blocked acid catalyst having a blocking agent which is not a tertiary amine, and a volatile tertiary amine present in an amount equal to 30 to 100% by weight of the blocking agent.

In one preferred embodiment of the invention, the blocked acid catalyst will be a strong acid having a $pK_a$ of 2.5 or less and a blocking agent which is a primary amine or a secondary amine.

In another preferred embodiment of the invention, the volatile tertiary amine will have a boiling point of at least 100 degrees C.

The invention further provides a method of obtaining a thermally cured film having improved scratch and mar resistance wherein the composition of the invention is applied to a substrate to provide a coated substrate. The coated substrate is then thermally cured to provide a cured film.

The invention also provides a method of making a multilayer coated substrate having a substantially unwrinkled appearance and improved scratch and mar resistance. In this method of the invention, a first coating composition is applied to a substrate to provide a first coated substrate, said first coating composition comprising a compound which is selected from the group consisting of a tertiary amine and a high imino aminoplast resin. A second coating composition is then applied to the first coated substrate to provide a second coated substrate, said second coating composition comprising (A) a film-forming component comprising (a) one or more active hydrogen containing compounds, and (b) a crosslinking agent comprising at least one aminoplast resin (bi) having from 0.5 to 3.5 moles of NH per mole of aminoplast resin, (B) a blocked acid catalyst having a blocking agent which is not a tertiary amine, and (C) a tertiary amine present in an amount equal to 10 to 150% by weight of the blocking agent. The second coated substrate is then cured to provide a multilayer-coated substrate having a substantially unwrinkled appearance.

In one preferred embodiment of the method for making a multilayer coated substrate, the first coating composition is a waterborne basecoat while the second coating composition is a solventborne clearcoat composition.

DETAILED DESCRIPTION OF THE INVENTION

It has unexpectedly been found that improvements in scratch and mar resistance as well as compatibility with other coating compositions can be achieved with the use of a particular curable coating composition.

The curable coating compositions of the invention require a film-forming component (A), a catalyst (B), and a volatile catalyst carrier (C). Film-forming component (A) must comprise one or more curing or crosslinking agents (b), at least one of which must be an aminoplast resin (bi) having from 0.5 to 3.5 moles of NH per mole of aminoplast resin (bi). It is another aspect of the invention that catalyst (B) be a blocked acid catalyst having a blocking agent which is not a tertiary amine.

While not wishing to be bound to a particular theory, it is believed that the combination of these particular components results in a greater crosslink density at the uppermost surface of an applied and cured film of said coating composition. This greater crosslink density in the uppermost portion of the cured film surface is believed to contribute to the observed improvements in scratch and mar resistance.

Film-forming component (A) may generally be polymeric or oligomeric and will generally comprise one or more compounds or components having a number average molecular weight of from 900 to 1,000,000, more preferably from 900 to 10,000. Compounds comprising film-forming component (A) will generally have an equivalent weight of from 114 to 2000, and more preferably 250 to 750. Most preferably, the coating composition of the invention will be a curable thermosetting coating wherein film-forming component (A) comprises a component (a) having a plurality of active hydrogen-containing functional groups and a crosslinking or curing agent (b) having functional groups reactive with those of component (a). It will be appreciated that the coating compositions of the invention may be one component or two component coating compositions but will most preferably be one component compositions.

Film-forming component (A) may be present in the coating composition in amounts of from 0 to 90%, preferably from 1 to 70%, and most preferably from 5 to 40%, all based on the fixed vehicle solids of the coating composition, i.e., % nonvolatile (NV) of all film-forming components. In the most preferred embodiment, film-forming active hydrogen containing component (a) will be present in an amount of from 1 to 99, more preferably from 40 to 90, and most preferably from 60 to 90, all based on the % NV of film-forming component (A). Likewise, film-forming crosslinking component (b) will be present in an amount of from 1 to 99, more preferably from 10 to 60, and most preferably from 10 to 40, all based on the % NV of film-forming component (A).

The film-forming active hydrogen containing component (a) will comprise one or more active hydrogen group containing compounds. "Active hydrogen group" as used herein refers to functional groups that donate a hydrogen group during the reaction with the functional groups of the one or more crosslinking agents (b). Examples of active hydrogen groups are carbamate groups, hydroxyl groups, amino groups, thiol groups, acid groups, hydrazine groups, activated methylene groups, and the like. Preferred active hydrogen groups are carbamate groups, hydroxyl groups, and mixtures thereof.

Such active hydrogen group containing polymer resins include, for example, acrylic polymers, modified acrylic polymers, polyesters, polyepoxides, polycarbonates, polyurethanes, polyamides, polyimides, and polysiloxanes, all of which are well-known in the art. Preferably, component (a) is a polymer selected from the group consisting of acrylic, modified acrylic, polyester and/ polyurethane polymers. More preferably, the polymer is an acrylic or polyurethane polymer. Most preferably, component (a) will be one or more acrylic polymers.

In one preferred embodiment of the invention, the polymer comprising component (a) is an acrylic. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Amino-functional acrylic monomers would include t-butylaminoethyl methacrylate and t-butylamino-ethylacrylate. Other acrylic monomers having active hydrogen functional groups in the ester portion of the monomer are also within the skill of the art.

Modified acrylics can also be used as component (a) according to the invention. Such acrylics may be polyester-modified acrylics or polyurethane-modified acrylics, as is well known in the art. Polyester-modified acrylics modified with ε-caprolactone are described in U.S. Pat. No. 4,546,046 of Etzell et al, the disclosure of which is incorporated herein by reference. Polyurethane-modified acrylics are also well known in the art. They are described, for example, in U.S. Pat. No. 4,584,354, the disclosure of which is incorporated herein by reference.

Preferred carbamate functional acrylics useful as component (a) can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing one or more polymers or oligomers useful as film-forming component (a) is to react an already-formed polymer such as an acrylic polymer with another component to form a carbamate-functional group appended to the polymer backbone, as described in U.S. Pat. No. 4,758,632, the disclosure of which is incorporated herein by reference. Another technique for preparing polymers useful as film-forming component (a) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form a carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the most preferred carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

Such preferred polymers useful as film-forming component (a) will generally have a number average molecular weight of 2000–20,000, and preferably from 3000–6000. The carbamate content of the polymer, on a molecular weight per equivalent of carbamate functionality, will generally be between 200 and 1500, and preferably between 300 and 500.

Preferred carbamate functional acrylic film-forming components (a) can be represented by the randomly repeating units according to the following formula:

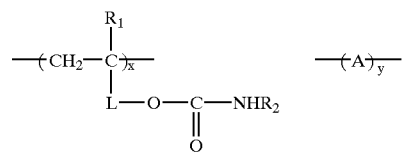

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. As previously discussed, such monomers for copolymerization with acrylic monomers are known in the art. Preferred such monomers will include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

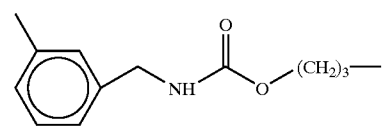

—($CH_2$)—, —($CH_2$)$_2$—, —($CH_2$)$_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

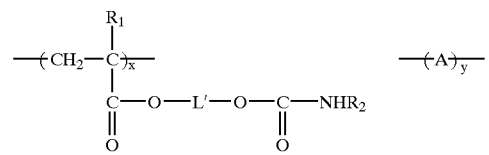

In this formula, $R_1$, $R_2$, A, x, and y are as defined above. L' may be a divalent aliphatic linking group, preferably of 1 to 8 carbon atoms, e.g., —($CH_2$)—, —($CH_2$)$_2$—, —($CH_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group.

A most preferred carbamate and hydroxyl functional polymer for use as film-forming component (a) will have a number average molecular weight of from 1000 to 5000, a carbamate equivalent weight of from 300 to 600, and a Tg of from 0 to 150° C. In an especially preferred embodiment, the carbamate-functional polymer will have a number average molecular weight of from 1500 to 3000, a carbamate equivalent weight of from 350 to 500, and a Tg of from 25 to 100° C.

This most preferred carbamate functional polymer for use as film-forming component (a) will have from at least 66 to 100% by weight, based on the total weight of the polymer, of one or more repeat units A selected from the group consisting of

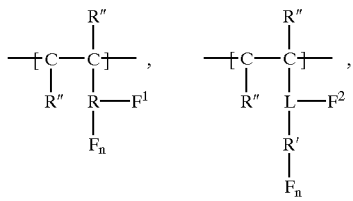

and mixtures thereof, and from 0 to less than 35% by weight, based on the total weight of the polymer, of one or more repeat units A' having the structure

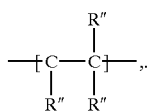

More preferably, this most preferred carbamate functional polymer for use as film-forming active hydrogen containing component (a) will have from 80 to 100 weight percent of one or more repeat units A and from 20 to 0 weight percent of one or more repeat units A', and most preferably, from 90 to 100 weight percent of one or more repeat units A and from 10 to 0 weight percent of one or more repeat units A', based on the total weight of the final carbamate functional polymer. A particularly preferred carbamate functional polymer of the invention will have more than 90 weight percent of one or more repeat units A and less than 10 weight percent, preferably between 1 and 9 weight percent, of one or more repeat units A', based on the total weight of the carbamate functional polymer of the invention.

In the above, R is an at least divalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups that are reactive with crosslinking agents under traditional coating curing conditions.

Illustrative examples of suitable R groups are aliphatic or cycloaliphatic linking groups of from 1 to 60 carbons, aromatic linking groups of from 1 to 10 carbons, and mixtures thereof. Preferred R groups include aliphatic or cycloaliphatic groups of from 2 to 10 carbons. R may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

A most preferred R group is

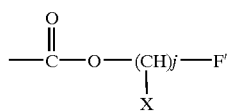

wherein j is from 1 to 6 and X is H or is a monovalent nonfunctional linking group having from 1 to 20 carbon atoms and from 0 to 20 heteroatoms selected from the group consisting of oxygen, nitrogen, sulfur, phosphorus, and silane, and mixtures thereof.

R' is an at least monovalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups that are reactive with crosslinking agents under traditional coating curing conditions.

Illustrative examples of suitable R' groups are aliphatic or cycloaliphatic linking groups of from 1 to 60 carbons, aromatic linking groups of from 1 to 10 carbons, and mixtures thereof. Preferred R' groups include aliphatic or cycloaliphatic groups of from 2 to 10 carbons. R' may, and preferably will, include one or more heteroatoms via one or more divalent internal linking groups such as esters, amides, secondary carbamates, ethers, secondary ureas, ketones, and mixtures thereof. The use of esters as internal linking groups is most preferred.

Examples of particularly preferred R' groups are

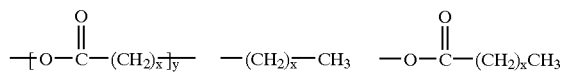

wherein x and y are from 0 to 10, preferably from 3 to 8.

In a preferred embodiment, the at least monovalent nonfunctional linking group R' will comprise at least one branched alkyl group of from 5 to 20 carbons, preferably from 5 to 15 carbons and most preferably from 8 to 12 carbons. An example of an especially suitable structure for incorporation into linking group R' is

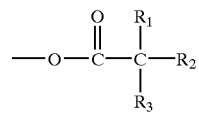

wherein $R_1$, $R_2$, and $R_3$ are alkyl groups of from 1 to 10 carbons each. Most preferably, $R_1$, $R_2$, and $R_3$ will total from 8 to 12 carbons with at least one of $R_1$, $R_2$, and $R_3$ being a methyl group. In a most preferred embodiment, n will be 0 when R' comprises this branched alkyl structure.

R" is H or a monovalent nonfunctional linking group having from 1 to 20 carbon atoms and from 0 to 20 heteroatoms selected from the group consisting of oxygen, nitrogen, sulfur, phosphorus, and silane, and mixtures thereof.

Illustrative examples of suitable R" groups are hydrogen, aliphatic or cycloaliphatic linking groups of from 1 to 60 carbons, aromatic linking groups of from 1 to 10 carbons, and mixtures thereof. R" may, and preferably will, include one or more heteroatoms via one or more divalent internal linking groups such as esters, amides, secondary carbamates, ethers, secondary ureas, ketones, and mixtures thereof.

Preferred R" groups are H, —CH$_3$, aromatic groups such as benzyl, and alkyl esters of from 2 to 10 carbons, especially from 4 to 8 carbons. H and methyl are most preferred as R".

L is an at least trivalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups that are reactive with crosslinking agents under traditional coating curing conditions.

Illustrative examples of suitable L groups are aliphatic or cycloaliphatic linking groups of from 1 to 60 carbons, aromatic linking groups of from 1 to 10 carbons, and mixtures thereof. Preferred L groups include aliphatic or cycloaliphatic groups of from 2 to 10 carbons. L may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

An example of preferred L groups are

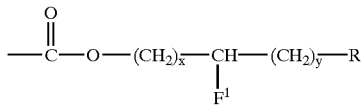

and isomers thereof, wherein $F^1$ and R are as described, x and y may the same or different and are from 0 to 10, preferably from 1 to 3, and is most preferably 1.

F, $F^1$ and $F^2$ are functional groups selected from the group consisting of primary carbamate groups, hydroxyl groups, and mixtures thereof, such as beta-hydroxy primary carbamate groups, with the proviso that at least one of $F^1$ and $F^2$ are a primary carbamate group or a beta-hydroxy primary carbamate group, and n is an integer from 0 to 3, most preferably 0.

Polyesters having active hydrogen groups such as hydroxyl groups can also be used as the film-forming component (a) in the coating composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Carbamate functional polyesters are also suitable for use as film-forming component (a) in the coating compositions of the invention. Suitable polyesters can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare suitable polyesters (a) include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogenated bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

Although the polyol component can comprise all diols, polyols of higher functionality can also be used. It is preferred that the polyol be a mixture of at least one diol and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is generally less than 3.3/1, preferably up to 1.4/1.

Carbamate groups can be incorporated into the polyester by first forming a hydroxyalkyl carbamate that can be reacted with the polyacids and polyols used in forming the polyester. A polyester oligomer can be prepared by reacting a polycarboxylic acid such as those mentioned above with a hydroxyalkyl carbamate. An example of a hydroxyalkyl carbamate is the reaction product of ammonia and propylene carbonate. The hydroxyalkyl carbamate is condensed with acid functionality on the polyester or polycarboxylic acid, yielding terminal carbamate functionality. Terminal carbamate functional groups can also be incorporated into the polyester by reacting isocyanic acid with a hydroxy functional polyester. Also, carbamate functionality can be incorporated into the polyester by reacting a hydroxy functional polyester with urea.

Carbamate groups can also be incorporated into the polyester by a transcarbamalation reaction. In this reaction, a low molecular weight carbamate functional material derived from a low molecular weight alcohol or glycol ether such as methyl carbamate is reacted with the hydroxyl groups of a hydroxyl functional polyester, yielding a carbamate functional polyester and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Besides carbamate functionality, polyester polymers and oligomers suitable for use as film-forming component (a) may contain other functional groups such as hydroxyl, carboxylic acid and/or anhydride groups. The equivalent weight of such polyesters containing terminal carbamate groups may be from about 140 to 2500, based on equivalents of carbamate groups. The equivalent weight is a calculated value based on the relative amounts of the various ingredients used in making the polyester, and is based on the solids of the material.

Polyurethanes having active hydrogen functional groups such as described above which are suitable for use as film-forming component (a) are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Carbamate functional polyurethanes may be prepared by reacting the active hydrogen groups with a low molecular weight carbamate functional material derived from a low molecular weight alcohol or glycol ether such as methyl.

Other carbamate functional compounds preferred for use as active hydrogen containing component (a) are carbamate-functional compounds which are the reaction product of a mixture comprising a polyisocyanate or a chain extended polymer, and a compound comprising a group that is reactive with isocyanate or a functional group on the chain extended polymer as well as a carbamate group or group that can be converted to carbamate. Such compounds are described in U.S. Pat. Nos. 5,373,069 and 5,512,639 hereby incorporated by reference.

In a most preferred embodiment, active hydrogen containing component (a) will be selected from the group consisting of carbamate functional acylics, carbamate functional modified acrylics, hydroxyl functional acrylics, hydroxyl functional modified acrylics, polyurethanes, polyesters and mixtures thereof, with carbamate functional acylics, hydroxyl functional acrylics, and carbamate/hydroxyl functional acrylics as described above being especially preferred.

It will be appreciated that in a most preferred embodiment, the coating compositions of the invention will be compositions which are free of resins having functional groups such as acid groups which require the presence of a salting amine.

The coating compositions of the invention also require the use of one or more crosslinking agents (b) having two or more functional groups reactive with active hydrogen containing compound (a). In general, crosslinking agent (b) may be present in the coating composition in amounts of from 0 to 90%, preferably from 0 to 70%, and most preferably from 1 to 35%, all based on the fixed vehicle solids of the coating composition, i.e., % NV of film-forming component (A). The functional groups of the crosslinking agent (b) may be of more than one kind, i.e.; one or more crosslinking agents (b) may be a mixture of crosslinking agents.

Useful crosslinking or curing agents (b) include materials having active methylol, methylalkoxy, or imino groups, such as aminoplast crosslinking agents or phenol/formaldehyde adducts; curing agents that have isocyanate groups, particularly blocked isocyanate curing agents; curing agents that have epoxide groups, amine groups, acid groups, siloxane groups, cyclic carbonate groups, and anhydride groups; and mixtures thereof.

However, it is an aspect of the invention that at least one of the one or more curing agents (b) be an high imino aminoplast resin (bi). Imino functional melamine formaldehyde resins such as those which are formed from the reaction of less than 5.5 moles of formaldehyde with one mole of triazine are especially suitable and preferred for use herein. Remaining sites will preferably be alkylated with either methanol or butanol. Both monomeric and polymeric are suitable but monomeric are most preferred. High imino functional aminoplast resins are more preferred, such as those having from 0.5 to 3.5 moles of NH per mole of resin, with those having from 1.5 to 2.5 moles being particularly preferred.

In an especially preferred coating composition of the invention, one or more crosslinking agents (b) will be selected such that the reaction of at least one active hydrogen containing compound (a) and at least one crosslinking agent (b) results in a urethane linkage. In a most preferred embodiment, components (a) and (b) will be selected such that only urethane linkages are formed in film-forming component (A), with noncyclic urethane linkages being most preferred.

Illustrative examples of suitable crosslinking agents (b) include, without limitation, monomeric or polymeric aminoplast resins such as full or partially methyolated and/or alkoxylated melamine formaldehyde or urea formaldehyde resins.

Other suitable crosslinking agents (b) include blocked or unblocked polyisocyanates (e.g., TDI, MDI, isophorone diisocyanate, hexamethylene diisocyanate, and isocyanurates of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Isocyanate functional crosslinking agents (b) are especially preferred, with hexamethylene diisocyanate (HDI) being particularly preferred.

The crosslinking agent (b) may be combinations of these, particularly combinations that include aminoplast crosslinking agents and/or high imino aminoplast resins. Combinations of high imino melamine formaldehyde resin and a blocked isocyanate curing agent are likewise suitable and desirable.

Another aspect of the coating compositions of the invention is the presence of a catalyst (B) for the reaction or reactions between one or more active hydrogen containing compounds (a) and one or more crosslinking agents (b). Catalyst (B) must be a blocked acid catalyst wherein the blocking agent is not a tertiary amine.

In a most preferred embodiment, catalyst (B) is a strong acid catalyst (Bi) having a $pK_a$ of 2.5 or less, most preferably a $pK_a$ of 1.5 or less. Examples of suitable strong acid catalysts include $C_1$–$C_{20}$ alkyl sulfonic acids, dinonylnaphthalene (mono) sulfonic acid (DNNSA), dinonylnaphthalene disulfonic acid (DNNDSA), dodecylbenzeIllune sulfonic acid (DDBSA), para-toluene sulfonic acid (p-TSA), acid phosphates such as phenyl acid phosphate, mixtures thereof, and the like.

Suitable blocking agents (Bii) for such strong acid catalysts include electron pair donors which are not tertiary amines, such as primary amines, secondary amines, epoxides, or mixtures thereof. The acid catalyst (B) may also blocked with covalently bonded compounds. Preferred blocking agents are the secondary amines and the primary amines, with secondary amines being most preferred.

Blocking agent present on catalyst (B) will generally be present in approximately a 1:1 molar ratio of catalyst to blocking agent.

Blocked acid catalyst (B) may be prepared by one of ordinary skill in the art using traditional acid/base reaction chemistry. Room temperatures reactions of the basic amines with the strong acid catalysts are preferred, especially those which go to more than 95% completion. In a most preferred embodiment, blocked acid catalyst (B) will be prepared prior to incorporation into the coating compositions of the invention.

Catalyst (B) will generally be present in an amount of from 0.1 to 5.0% by weight, based on the nonvolatile weight of film-forming component (A). More preferably, catalyst (B) will be present in an amount of from 0.1 to 2.0, and most preferably from 0.5 to 1.5%, all based on the nonvolatile weight of film-forming component (A).

The coating compositions of the invention further comprise a volatile tertiary amine (C). Although the mechanism of interaction between film-forming component (A), catalyst (B), and volatile tertiary amine (C) is not well understood, it is believed to result in the formation of a particular crosslink density gradient as measured from the top of a cured film to the bottom of the cured film adjacent to the substrate.

In particular, the crosslink density of the top 10% of the cured film should be greater than the lowest 10% of the cured film, more preferably greater than the lowest 25% of the cured film, and most preferably greater than the lowest 50% of the cured film. More preferably, the crosslink density of the uppermost 10% of the cured film should be at least double (i.e., 2.0 times) that of the lowest 10% of the cured film, more preferably double that of the lowest 25% of the cured film, and most preferably double that of the lowest 50% of the cured film. In the most preferred embodiment, the uppermost 10% of the cured film will have a crosslink density which is from 2.1 to 3.5 times that of the lowest 10% of the cured film, more preferably 2.1 to 3.5 times that of the lowest 25% of the cured film, and most preferably 2.1 to 3.5 times that of the lowest 50% of the cured film. Crosslink density is measured using techniques such as dynamic mechanical thermal analysis As with catalyst (B), the selection of volatile tertiary amine (C) will to some extent be dependent upon the selection of film-forming component (A) and the identity of nonvolatile catalyst (B). "Volatile" as used herein refers to compounds that volatilize upon exposure to curing of an applied film. Volatile tertiary amine (C) will generally be a tertiary amine having a boiling point such that it will volatilize upon curing of the coating composition.

Preferred tertiary amines are those having a boiling point of at least 100 degrees C. More preferably, volatile tertiary amine (C) will be a tertiary amine having a boiling point of greater than 150 degrees C. and most preferably, a tertiary amine having a boiling point greater than 200 degrees C. Tertiary amines having a boiling of from 200 to 260 degrees C. are especially preferred.

Volatile tertiary amines will generally be present in amounts of from 10 to 150%, preferably from 20 to 110%, more preferably from 30 to 100%, and most preferably from 30 to 80%, all based on the weight of the blocking agent (Bii) of catalyst (Bi).

Suitable tertiary amines may thus be monoamines or polyamines, although monoamines are preferred. Polyamines containing mixtures of amines other than tertiary amines may also be used although they are not preferred. They may be cyclic, aliphatic or aromatic, although aliphatic amines are preferred. They may contain heteroatoms as in the case of alkanolamines.

Illustrative examples of tertiary amines useful as volatile catalyst carrier (C) include triethanolamine, triethyl amine, N,N-dimethylethanol amine, N,N, diemthyl 2-amino, 2-methyl propanol, NN-dimethyl-1,3-propanediamine, N,N-dimethyldodecylamine, N,N-dimethyloctylamine, N,N-dimethylnonylamine, mixtures thereof, and the like. Aliphatic monoamines are preferred, with aliphatic monoamines having fatty chains of from 8 to 16 carbons being particularly preferred, with N,N-dimethyloctylamine, N,N-dimethylnonylamine, and N,N-dimethyldodecylamine being most preferred.

A solvent may optionally be utilized in the coating compositions of the present invention. Although the composition used according to the present invention may be utilized, for example, in the form of substantially solid powder, or a dispersion, it is often desirable that the composition is in a substantially liquid state, which can be accomplished with the use of a solvent. This solvent should act as a solvent with respect to the components of the composition. In general, the solvent can be any organic solvent and/or water. In one preferred embodiment, the solvent is a polar organic solvent. More preferably, the solvent is selected from polar aliphatic solvents or polar aromatic solvents. Still more preferably, the solvent is a ketone, ester, acetate, aprotic amide, aprotic sulfoxide, alcohol, ether alcohol, ether acetate and the like, or a combination of any of these. Examples of useful solvents include, without limitation, methyl ethyl ketone, methyl isobutyl ketone, n-amyl acetate, ethylene glycol butyl ether-acetate, propylene glycol monomethyl ether acetate, xylene, N-methylpyrrolidone, blends of aromatic hydrocarbons, and mixtures of these.

In another preferred embodiment, the solvent is a mixture of a small amount of water, i.e., less than 20% by weight, most preferably less than 15% by weight of water, with other primary solvents selected from organic solvents, water-miscible solvents and mixtures thereof.

In a preferred embodiment of the invention, the solvent is present in the coating composition in an amount of from about 0.01 weight percent to about 99 weight percent, preferably from about 10 weight percent to about 60 weight percent, and more preferably from about 3 0 weight percent to about 50 weight percent.

Additional agents, for example surfactants, fillers, stabilizers, wetting agents, dispersing agents, adhesion promoters, UV absorbers, hindered amine light stabilizers, rheology controlling agents such as silicas and/or urea compounds etc. may be incorporated into the coating compositions of the invention. While such additives are well-known in the prior art, the amount used must be controlled to avoid adversely affecting the coating characteristics.

Coating compositions according to the invention may be used as primers, especially weatherable primers, basecoats, topcoats, and/or clearcoats. They are particularly suitable for use in coating compositions used in composite color-plus-clear coating systems and the like, and may be one component or two component. In a particularly preferred embodiment, coating compositions according to the invention are preferably utilized in high-gloss coatings and/or as clearcoats of composite color-plus-clear coatings. High-gloss coatings may be described as coatings having a 20° gloss or more(ASTM D523-89) or a DOI (ASTM E430-91) of at least 80.

When the coating composition of the invention is used as a high-gloss pigmented paint coating, the pigment may be any organic or inorganic compounds or colored materials, fillers, metallic or other inorganic flake materials such as mica or aluminum flake, and other materials of kind that the art normally includes in such coatings. Pigments and other insoluble particulate compounds such as fillers are usually used in the composition in an amount of 1% to 100%, based on the total solid weight of binder components (i.e., a pigment-to-binder ratio of 0.1 to 1).

When the coating composition according to the invention is used as the clearcoat of a composite color-plus-clear coating, the pigmented basecoat composition may be any of a number of types well-known in the art, and does not require explanation in detail herein. Polymers known in the art to be useful in basecoat compositions include acrylics, vinyls, polyurethanes, polycarbonates, polyesters, alkyds, and polysiloxanes. Preferred polymers include acrylics and polyurethanes. In one preferred embodiment of the invention, the basecoat composition also utilizes a carbamate-functional acrylic polymer. Basecoat polymers may be thermoplastic, but are preferably crosslinkable and comprise one or more type of crosslinkable functional groups. Such groups include, for example, hydroxy, isocyanate, amine, epoxy, acrylate, vinyl, silane, and acetoacetate groups. These groups may be masked or blocked in such a way so that they are unblocked and available for the crosslinking reaction under the desired curing conditions, generally elevated temperatures. Useful crosslinkable functional groups include hydroxy, epoxy, acid, anhydride, silane, and acetoacetate groups. Preferred crosslinkable functional groups include hydroxy functional groups and amino functional groups.

In one aspect of the invention, the basecoat will be of a composition offering particular compatibility challenges for subsequently applied clearcoat compositions of the prior art. Illustrative examples of such basecoat compositions include waterborne or solventborne basecoats containing high imino aminoplast resins. It has been found that it is difficult to achieve desirable intercoat adhesion between basecoats containing high imino aminoplast resins and subsequently applied clearcoat compositions. Another basecoat formulation difficult for clearcoat compatibility are basecoat compositions containing tertiary amines, especially waterborne basecoats having tertiary amines as salting agents for anionically dispersed resins. It has been found that subsequently applied clearcoats often wrinkle upon cure when applied over such tertiary amine containing basecoats. This effect is especially well known when a low imino aminoplast resin is used in the clearcoat.

Basecoat polymers may be self-crosslinkable, or may require a separate crosslinking agent that is reactive with the functional groups of the polymer. When the polymer comprises hydroxy functional groups, for example, the crosslinking agent may be an aminoplast resin, isocyanate and blocked isocyanates (including isocyanurates), and acid or anhydride functional crosslinking agents.

Coating compositions can be coated on desired articles by any of a number of techniques well known in the art. These include, for example, spray coating, dip coating, roll coating, curtain coating, and the like. For automotive body panels, spray coating is preferred.

The coating compositions of the invention may be applied may be applied to a wide variety of substrates, especially those typically encountered in the transportation/automotive industries. Illustrative examples include metal substrates such as steel, aluminum, and various alloys, flexible plastics, rigid plastics and plastic composites.

The coating compositions described herein are preferably subjected to conditions so as to cure the coating layers. Although various methods of curing may be used, thermal or heat-curing is preferred. Most preferably, curing will be achieved solely by the application of heat. Generally, heat curing is effected by exposing the coated article to elevated temperatures provided primarily by radiative heat sources. Curing temperatures will vary depending on the particular blocking groups used in the cross-linking agents, however they generally range between 90° C. and 180° C. The first compounds according to the present invention are preferably reactive even at relatively low cure temperatures. Thus, in a preferred embodiment, the cure temperature is preferably between 115° C. and 150° C., and more preferably at temperatures between 115° C. and 140° C. for a blocked acid catalyzed system. For an unblocked acid catalyzed system, the cure temperature is preferably between 80° C. and 100° C. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

A carbamate functional and high imino aminoplast based clearcoat was prepared per Table 1.

TABLE 1

| | |
|---|---|
| Carbamate functional acrylic resin[1] | 46.29% |
| Polymeric high imino melamine[2] | 17.87% |
| Non tertiary amine blocked DDBSA | 1.20% |
| Flow additive[3] | 0.40% |

TABLE 1-continued

| | |
|---|---|
| Flow additive[4] | 0.025% |
| UV absorber[5] | 3.00% |
| HALS[6] | 1.50% |
| Blocked isocyanate[7] | 5.00% |
| Rheology Agent[8] | 1.25% |
| Plastizer[9] | 5.28% |

[1]Per U.S. Pat. App. S.N. 09/677,063
[2]Resimene ® BM-9539
[3]Silwet ® L7604
[4]Disparlon ®LC-955
[5]Tinuvin ® 400
[6]Sanduvor ® 3058
[7]Desmodur ® TP LS 2253
[8]3.45% Diurea crystals in carbamate functional acrylic resin.
[9]Pripol ® 2033

EXAMPLES 2 & 3

For example 2, dimethyl AMP, a tertiary amine, was added as a free add to the clearcoat composition of Example 1 in an amount of 0.25% and 0.5%, based on the total percent nonvolatile film-forming components of the composition.

For example 3, a clearcoat composition was prepared as per Example 1 except that a different non tertiary amine blocked DDBSA was used. Dimethyl AMP was added as a free add to this clearcoat composition in the amounts used in Example 2.

For the appearance evaluation, all clearcoat samples were sprayed over a pewter metallic waterborne acrylic/high imino aminoplast based basecoat, commercially available from BASF Corporation of Southfield, Mich., as E211KW045S. The basecoat was sprayed over electrocoated and phosphated steel panels and flashed for 10 minutes at 140 degrees F. The clearcoat samples were then spray applied followed by a 10 minute flash at room temperature. The composite color-plus-clear coatings were then cured via 20 minutes at 275 degrees F. (metal temperature).

The panels for the popping evaluation were prepared as per the appearance panels except that the clearcoat samples were sprayed in a wedge such that the greatest film build was at the bottom of the panel with the film build diminishing to the minimum film at the top of the panel. The panels were then flashed for 10 minutes at room temperature and baked for 30 minutes at 275 degrees F.

Horizontal and vertical appearance values were evaluated using a Autospec™ meter model QMS BP, from Autospect of Ann Arbor, Mich. The Autospec value reflects gloss (GLOSS), DOI (DORI), and waviness (OPEEL). The reported Autospec number "COMB" is the average of the three readings.

TABLE 2

| | Horizontal | | | | Vertical | | | | |
|---|---|---|---|---|---|---|---|---|---|
| | GLOSS | DORI | OPEEL | COMB | GLOSS | DORI | OPEEL | COMB | POP |
| Non tertiary amine blocked DDBSA | 18.5 | 32.4 | 29.7 | 29.0 | 27.3 | 39.3 | 42.7 | 39.2 | — |
| Non tertiary amine blocked DDBSA + 0.25% DMAMP | 33.5 | 44.0 | 51.8 | 46.3 | 41.2 | 51.3 | 56.6 | 52.5 | — |
| Non tertiary amine blocked DDBSA + 0.50% DMAMP | 45.2 | 55.0 | 67.0 | 59.6 | 48.5 | 58.3 | 59.0 | 57.2 | — |
| Non tertiary amine blocked DDBSA | 36.4 | 46.0 | 52.2 | 47.7 | 40.8 | 50.6 | 53.1 | 50.3 | 1.5 |
| Non tertiary amine blocked DDBSA + 0.25% DMAMP | 59.0 | 66.5 | 74.2 | 69.2 | 47.4 | 57.1 | 59.6 | 56.9 | 1.9 |
| Non tertiary amine blocked DDBSA + 0.5% DMAMP | 55.0 | 62.5 | 70.7 | 65.5 | 45.4 | 55.1 | 58.5 | 55.4 | 1.9 |

It can be seen that composite color-plus-clear compositions prepared according to the invention provide improvements in all aspects of appearance. It can also be seen that improvements in resistance to solvent popping are also obtained.

EXAMPLE 4

A clearcoat composition was prepared per Table 3.

TABLE 3

| | |
|---|---|
| Carbamate functional acrylic resin[10] | 30.77% |
| Carbamate polyester | 21.11% |
| Polymeric melamine[11] | 29.85% |
| Non tertiary amine blocked DDBSA | 1.20% |
| Flow additive[12] | 0.40% |
| Flow additive[13] | 0.025% |
| UV absorber[14] | 3.00% |
| HALS[15] | 1.50% |
| Blocked isocyanate[16] | 5.00% |
| Rheology Additive[17] | 1.25% |
| Plasticizer[18] | 5.56% |

[10]Per U.S. Pat. App. S.N. 09/677,063
[11]Resimene BM-9539
[12]Silwet L7604
[13]Disparlon LC-955
[14]Tinuvin 400
[15]Sanduvor 3058
[16]Desmodur ® TP LS 2253
[17]Diurea Crystals in Carbamate Functional Resin
[18]Pripol ® 2033

0.64% N,N-dimethyldodecylamine, a tertiary amine, was added to this clearcoat. Panels were prepared as per Examples 2 & 3. Scratch and mar was evaluated per Ford Laboratory Test Method BI 161-01, hereby incorporated by reference in its entirety. Appearance was evaluated as per Examples 2 & 3.

It can be seen that the clearcoat composition according to the invention provides improvements in compatibility, appearance and scratch and mar resistance.

What is claimed is:

1. A curable coating composition comprising
    (A) a film forming component comprising
        (a) one or more active hydrogen containing components, and
        (b) one or more curing agents comprising at least one aminoplast resin (bi) having from 0.5 to 3.5 moles of NH per mole of aminoplast resin (bi),
    (B) a blocked acid catalyst having a blocking agent which is not a tertiary amine, and
    (C) a volatile tertiary amine present in an amount equal to 10 to 150% by weight of the blocking agent.

2. The curable coating composition of claim 1 wherein at least one active hydrogen containing component (a) and at least one curing agent (b) react to form a urethane linkage.

3. The curable coating composition of claim 1 wherein the one or more active hydrogen containing compounds (a) comprise a compound selected from the group consisting of carbamate functional compounds, OH functional compounds, carbamate and hydrogen functional compounds, and mixtures thereof.

4. The curable coating composition of claim 3 wherein the one or more active hydrogen containing compounds (a) comprise carbamate functional compounds.

5. The curable coating composition of claim 3 wherein the one or more active hydrogen containing compounds (a) comprise hydroxyl functional compounds.

6. The curable co coating composition of claim 3 wherein the one or more active hydrogen containing compounds (a) comprise a mixture of carbamate functional compounds and hydroxyl functional compounds.

7. The curable coating composition of claim 1 wherein the one or more curing agents (b) consist of the at least one

TABLE 4

| | Horizontal | | | | Vertical | | | | |
|---|---|---|---|---|---|---|---|---|---|
| | GLOSS | DORI | OPEEL | COMB | GLOSS | DORI | OPEEL | COMB | S&M |
| 1.2% Non tertiary amine Blocked DDBSA | 25.8 | 38.2 | 44.1 | 39.3 | 28.1 | 41.2 | 46.2 | 41.8 | 63.9% |
| 1.2% Non tertiary amine Blocked DDBSA + 0.64%, N,N-dimethyldodecylamine | 51.6 | 61.8 | 71.9 | 65.3 | 40.9 | 54.3 | 60.5 | 55.4 | 83.6% | aminoplast curing agent (bi) having from 0.5 to 3.5 moles of NH per mole of curing agent.

8. The curable coating composition of claim 1 wherein the one or more curing agents (b) comprise an isocyanate functional resin.

9. The curable coating composition of claim 1 wherein the at least one aminoplast resin (bi) has from 1.0 to 3.5 moles of NH per mole of aminoplast resin (bi).

10. The curable coating composition of claim 1 wherein the at least one aminoplast resin (bi) has from 1.5 to 2.5 moles of NH per mole of aminoplast resin (bi).

11. The curable coating composition of claim 10 wherein the at least one aminoplast resin (bi) is a monomeric aminoplast resin.

12. The curable coating composition of claim 1 wherein the blocked acid catalyst (B) comprises (Bi) one or more strong acids having a $pK_a$ of less than or equal to 2.5 and (Bii) a blocking agent which is not a tertiary amine.

13. The curable coating composition of claim 12 wherein the one or more strong acids (Bi) are selected from the group consisting of DNNSA, DNNDSA, DDBSA, p-TSA, and mixtures thereof.

14. The curable coating composition of claim 12 wherein the blocking agent (Bii) is selected from the group consisting of electron pair donors which are not tertiary amines.

15. The curable coating composition of claim 14 wherein the blocking agent (Bii) is selected from the group consisting of primary amines, secondary amines, and mixtures thereof.

16. The curable coating composition of claim 1 wherein the tertiary amine (C) has a boiling point of from 100 to 180° C.

17. The curable coating composition of claim 16 wherein the tertiary amine (C) has a boiling point of at least 200° C.

18. The curable coating composition of claim 17 wherein the tertiary amine (C) has a boiling point of from 200 to 260° C.

19. The curable coating composition of claim 1 wherein the tertiary amine (C) is present in an amount of from 20 to 110% by weight of the blocking agent.

20. The curable coating composition of claim 19 wherein the tertiary amine (C) is present in an amount of from 30 to 100% by weight of the blocking agent.

21. The curable coating composition of claim 20 wherein the tertiary amine (C) is present in an amount of from 30 to 80% by weight of the blocking agent.

22. A method of obtaining a cured film having improved scratch and mar resistance, the method comprising
    applying a coating composition to a substrate to provide a coated substrate, said coating composition comprising
    (A) a film forming component comprising
        (a) one or more active hydrogen containing components, and
        (b) one or more curing agents comprising at least one aminoplast resin (bi) having from 0.5 to 3.5 moles of NH per mole of aminoplast resin (bi),
    (B) a blocked acid catalyst having a blocking agent which is not a tertiary amine, and
    (C) a tertiary amine present in an amount equal to 30 to 100% by weight of the blocking agent, and
    thermally curing the coated substrate to provide a cured film on the substrate.

23. A method of making a multilayer coated substrate having a substantially unwrinkled appearance and improved scratch and mar resistance, comprising
    applying a first coating composition to a substrate to provide a first coated substrate, said first coating composition comprising a tertiary amine, and
    applying a second coating composition to the first coated substrate to provide a second coated substrate, said second coating composition comprising
    (A) a film-forming component comprising
        (a) one or more active hydrogen containing compounds, and
        (b) a crosslinking agent comprising at least one aminoplast resin (bi) having from 0.5 to 3.5 moles of NH per mole of aminoplast resin,
    (B) a blocked acid catalyst having a blocking agent which is not a tertiary amine, and
    (C) a tertiary amine present in an amount equal to 30 to 100% by weight of the blocking agent, and
    curing said second coated substrate to provide a multilayer coated substrate having a substantially unwrinkled appearance.

* * * * *